United States Patent Office 3,824,150
Patented July 16, 1974

3,824,150
ENZYME BOUND TO POLYMERIC SHEET WITH A TRIAZINE BRIDGING GROUP
Malcolm Douglas Lilly, Garth Kay, Richard John Hugh Wilson, and Alister Kimball Sharp, London, England, assignors to National Research Development Corporation, London, England
Filed July 5, 1968, Ser. No. 742,901
Claims priority, application Great Britain, July 14, 1967, 32,541/67; Apr. 10, 1968, 17,322/68
Int. Cl. C07g 7/02
U.S. Cl. 195—63                9 Claims

ABSTRACT OF THE DISCLOSURE

A method of carrying out an enzymatic reaction which comprises contacting a liquid medium containing a substance which is capable of being chemically altered by an enzyme with a permeable or impermeable sheet that comprises an enzyme chemically bonded to an insoluble support and recovering a product of the reaction.

---

Figure 1:
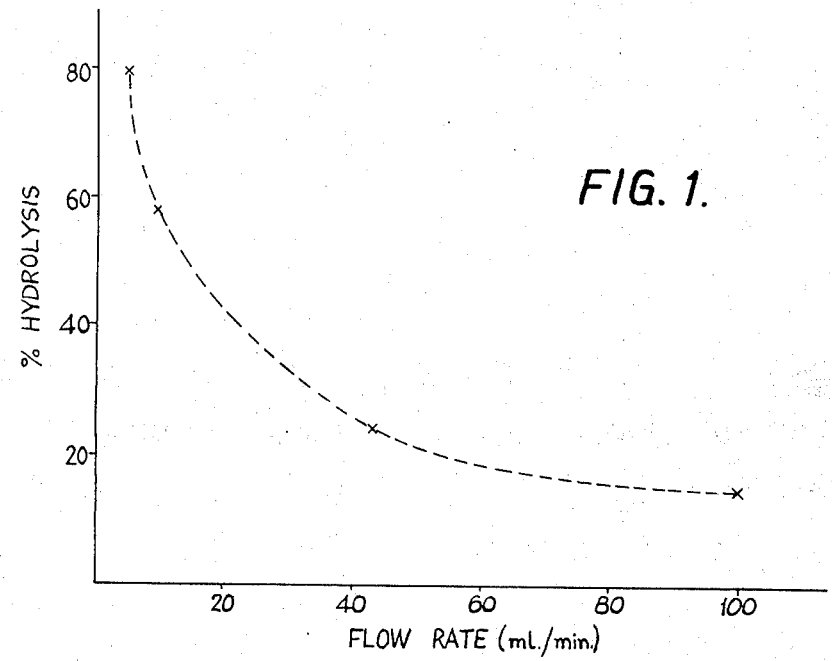

This invention relates to enzymes, and in particular to an insolubilised enzyme and to a method of carrying out enzymatic reactions using an insolubilised enzyme.

It is known that enzymes may be bound on to or into water-insoluble polymers to form "insoluble" enzymes, and that these "insoluble" enzymes may be used in various reactions in the form of discrete particles, for example, in a slurry or a packed bed. The use of such bound enzymes has, however, many disadvantages. The catalytic activity of these insoluble enzyme preparations is often so high that only a short contact time between enzyme and substrate is needed to bring about virtually complete conversion of substrate to product. In the present context, the word "substrate" means a substance upon which an enzyme acts. In the case of slurries, the enzymes must then be separated from the reaction medium. In packed beds a short contact time may be achieved either by using a high rate of flow of reactant through the bed, resulting in a large pressure drop, or by using shallow beds, where channelling becomes a major problem. Other important difficulties in operating packed beds include compressibility, clogging of the bed and hence reduced throughput, and the inability to pass a reverse flow of liquid through the bed without affecting its stability and performance.

Goldman et al. in *Science*, vol. 150, pp. 758–760 (1965), describe a stable papain membrane prepared by absorbing papain in a collodion membrane and cross-linking the papain with bisdiazobenzidine-3,3'-disulphonic acid. In such a membrane, however, the enzyme is in the form of a cross-linked macromolecule which is mechanically trapped in the membrane.

The preparation of shaped structures in which enzymes are embedded has been described in B.P. 953,414. Such shaped structures are prepared by the addition of the enzyme to a support consisting of a semi-permeable material to give a simple admixture of enzyme and support.

In both these cases, the enzyme is mechanically trapped within its semi-permeable support and thus reaction can take place only by diffusion of the solution of substrate through the support. Furthermore, these supports do not impart any extra stability to the enzyme.

An improved method of carrying out enzymatic reactions using an insolubilised enzyme has now been developed.

The invention comprises a method of carrying out an enzymatic reaction which comprises contacting a liquid medium containing a substance which is capable of being chemically altered by an enzyme with a permeable or impermeable sheet that comprises an enzyme chemically bonded to an insoluble support and recovering a product of the reaction.

Since enzymes in general tend to be somewhat unstable, it has been found to be desirable in the production of an insolubilised enzyme, that the enzyme be subjected to only very mild conditions, and to as few chemical reactions as possible.

Accordingly there is also included within the invention an insolubilised enzyme that has been produced by chemically treating an insoluble support in the form of a permeable or impermeable sheet to produce a stable intermediate containing reactive bridging groups and then reacting an enzyme with the reactive bridging groups so formed.

Enzymes which may be insolubilised in accordance with this invention comprise purified or crude enzymes, enzyme mixtures and enzymes systems present in or isolated from animals, plant or microbiological tissue and includes whole cells, intact intracellular particles and crude extracts of these tissues. Examples of such enzymes are proteolytic enzymes such as trypsin, chymotrypsin, and papain; hydrolases such as $\beta$-galactosidase, ribonuclease, alkaline phosphatase, amyloglucosidase and dextranase; dehydrogenases such as lactic dehydrogenase; kinases such as creatine phosphokinase, and pyruvate kinase; oxidases such as glucose oxidase; and amidases such as amidase, and pencillin amidase.

The term sheet is used in the sense of a body whose breadth is large in comparison with its thickness. Thus the insoluble support can be, for example, a pliable or rigid sheet or membrane made of natural or artificial material that is insoluble in the liquid medium in which the enzymatic reaction is carried out and for example it can comprise a natural or synthetic polymeric material particularly a hydrophilic material, for example one having free hydroxyl groups such as cellulose, cellulosic material, cross-linked dextrans sold under the trademark, Sephadex by Pharmacia of Uppsola, Sweden, starch, dextran, proteins such as wool, or polyvinyl alcohol. Other polymeric materials which can be used include nylon, Terylene and cellulose acetates. The material may be woven, laid down as a non-woven fabric, cast or extruded. It is particularly preferred if the sheet is permeable and preferably it has pores which are large enough to allow solution molecules to pass through the sheet substantially without steric hindrance. A suitable average pore diameter is often greater than $10^{-5}$ centimetre, particularly between $10^{-5}$ and $10^{-2}$ centimetre such as for example about $10^{-3}$ centimetre.

In the case of woven or non-woven fabrics, the porosity of the resultant sheet may be conditioned by the method of manufacture, and this particular characteristic of the sheet may be pre-determined to suit any special requirements. The sheet may be formed in or into simple geometric shapes such as for example tubes.

Where a permeable sheet is used in the process of the invention, the thickness of the sheet is preferably such that the pressure drop across the sheet is less than about one atmosphere, and usually the thickness of the sheet, or stack of sheets, is less than about one foot, and particularly between 0.01 inch and 1.0 inch such as for example 0.25 inch. With a permeable sheet flow rates as high as 15 cubic centimetre per minute per square centimetre of sheet can sometimes be obtained with good conversion. More usually the flow rate lies between 0.01 and 10.0 cubic centimetre per minute per square centimetre of sheet.

The enzyme is chemically bonded to the sheet by a bridging group, i.e. one that is capable of forming a chemical link between the sheet and the enzyme. It is usually necessary that the enzyme should be bonded to the sheet in such a way that the enzyme is not detached from the sheet by passage of the substrate either through or over the sheet.

Methods for treating an insoluble support so as to produce a stable intermediate containing reactive bridging groups include, for example, forming carboxymethyl groups on a polymer such as cellulose, esterifying the pendant carboxymethyl groups, and then reacting them with hydrazine and nitrous acid to form the azide derivative. This can then be reacted with the enzyme. A particularly preferred stable intermediate is one that is produced by reacting a triazinyl compound with a polymer so as to produce a stable intermediate having attached thereto reactive bridging groups of the formula:

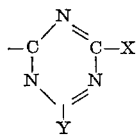

where X represents a reactive radical, for example, a halogen atom, and Y represents a halogen atom or a nucleophilic substituent that is an amino group or an aliphatic or aromatic group. Particularly suitable methods for chemically bonding enzymes to insoluble supports are described in U.S. Pat. Applications Nos. 742,978; 740,043; and 742,612.

In all these methods of attachment, it must be realised that the activity of the enzyme may be seriously affected by the physical conditions during manufacture. It is known, for instance, that the activity of such enzyme systems may be considerably reduced or eliminated if any drying process, particularly one involving heating, is used and it is recommended that a freeze-drying technique is employed for this purpose.

In one aspect of the invention, the sheets are permeable permitting the free passage of reactant solutions through them. These sheets may, therefore, be used in conditions of high flow rate without inducing high pressure drops.

In another aspect of the invention, the sheets are impermeable to liquids. These sheets may be used so that reactant solution passes along the length of the sheet. For example, the sheet may be made in the form of tubing or rolled up into a tube, one side of which either the inside or the outside, is treated chemically to attach an enzyme layer.

The insolubilised enzyme according to the invention may be used for a variety of purposes. If the sheets are permeable, a solution containing the reactants may be made to pass through the sheets. Such sheets may be used in a column, singly or in a stack, or be incorporated in a filter press or similar unit, in which the sheets are held in spacers which may contain fluid channels for the introduction of the solutions of the reactants or wash liquors. Alternatively, the sheet may be positioned to be parallel to the direction of flow of the reactant solution so that this solution passes lengthways along them. The sheet may, for instance, be in the form of a tube. A single unit may contain one or more sheets. Individual sheets may have different enzymes attached to them so that different reactions may be carried out within the same unit.

The insolubilised enzymes of the invention can be used in a wide variety of enzymatically catalysed reactions, and are often suitable for use in processes in which soluble enzymes have previously been used. Thus they may, for example be used in the preparation of penicillins, beer clarification, the preparation of glucose using amyloglucosidase, the preparation of optically active amino acids, and the formation of L-alanine by transamination. Other potential uses include enzymatic hydrolysis of carbohydrates and proteins, the processing of waste materials, the specific manipulation of large natural molecules such as steroids, alkaloids, chloramphenical and riboflavine, alcoholic and other kinds of fermentation, the fixing of nitrogen, a luciferase system for A.T.P. estimation, biochemical fuel-cells, and the specific oxidation and reduction of organic materials, including carbon dioxide fixation.

The insolubilised enzymes may also be used in enzymatic analysis, particularly in the sequential analysis of proteins, RNA and DNA. In this case the substrate can be, for example, forced through a permeable sheet by means of a syringe. Where chromatography follows the reaction, it may be possible to chromatograph the substrate across a permeable sheet containing the enzyme, for example in urea analysis.

The invention is illustrated by the following Examples:

EXAMPLE 1

A twill filter cloth was washed thoroughly in water, detergent, sodium carbonate and sodium hydroxide (1N) to remove non-cellulosic material. After soaking in sodium hydroxide for 30 minutes the excess sodium hydroxide solution was removed.

Cyanuric chloride (15 g.) was dissolved in 500 ml. of acetone. The cloth was added to this solution followed by water (250 ml.). After agitation for 5 minutes, the cloth was removed and washed in acetone-water (1:1 v./v.) for 10 minutes. The washing was repeated until the smell of cyanuric chloride could no longer be detected. Excess moisture was removed by using absorbent paper.

Chymotrypsin (0.25 g.) was dissolved in water and this solution was poured over those parts of the cloth through which the substrate is to pass. 0.1 M-phosphate buffer (pH 7), (25 ml.) was then added. After about 5 minutes at 20–25° C., excess ammonia/ammonium chloride buffer (pH 8.6), was added. This mixture was left at 2° C. overnight. The cloth was washed with large amounts of 1 M-chloride.

The cloth was fitted into a small filter press to give a cross-sectional area of about 100 sq. cm. A low molecular weight substrate of the enzyme, acetyltyrosine ethyl ester, at a concentration of 10 millimolar, was pumped through the filter cloth at various flow rates. The results for the percentage of ester hydrolysed at different flow rates are shown in FIG. 1.

EXAMPLE 2

Figure 2:
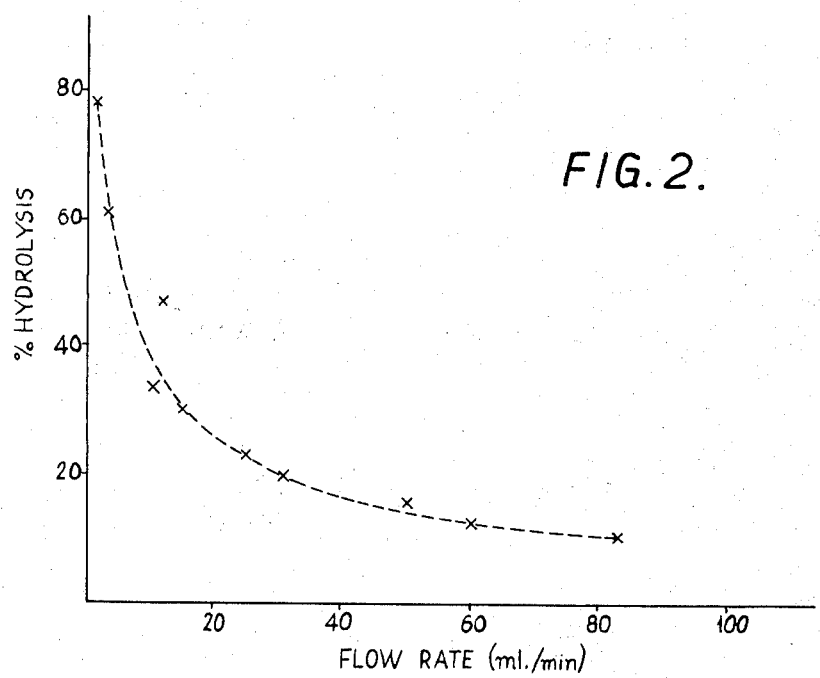

Chymotrypsin was chemically attached to sheets of Whatman No. 1 filter paper using the method described in Example 1. The hydrolysis of 1% (w./v.) casein by the above sheets is shown in FIG. 2. The filter consisted of 10 thicknesses of paper with a cross-sectional area of about 100 sq. cm.

EXAMPLE 3

Lactic dehydrogenase has been chemically attached to Whatman DE81 anion-exchange chromatography paper by the following method. A strip of the paper (46 x 6 cm.) was immersed in a fresh aqueous solution (250 ml.) at about 20° C. containing 0.05 g. of Procion brilliant orange dye MGS. After 10 minutes, 0.65 g. of anhydrous sodium carbonate was added and the liquid was gently agitated for 45 minutes. The paper was washed repeatedly in 1 M-sodium chloride until almost all the unreacted dye had been removed. The paper was rinsed thoroughly in water and freeze-dried.

A 3mM.-phosphate buffer (pH 7.4) (0.42 ml.) containing lactic dehydrogenase (7.6 mg./ml.) was added to 5 ml. of 0.1 M-sodium borate buffer (pH 8.75) and this mixture was poured over eight discs (2.5 cm. diameter) of the dyed DE81 paper and left for 28 hours at room temperature. The paper discs were washed three times with 1 M-sodium chloride (5 ml.) for 10 minutes. After further washing in a solution of 1 M-ammoniumchloride in 0.1 M-sodium hydroxide (pH 8.6) the discs were stored overnight in this solution at 2° C.

Finally the discs were rinsed five times with 1 M-sodium chloride (5–10 ml.) and four times with water (10 ml.). The discs were stored at 2° C.

Figure 3:
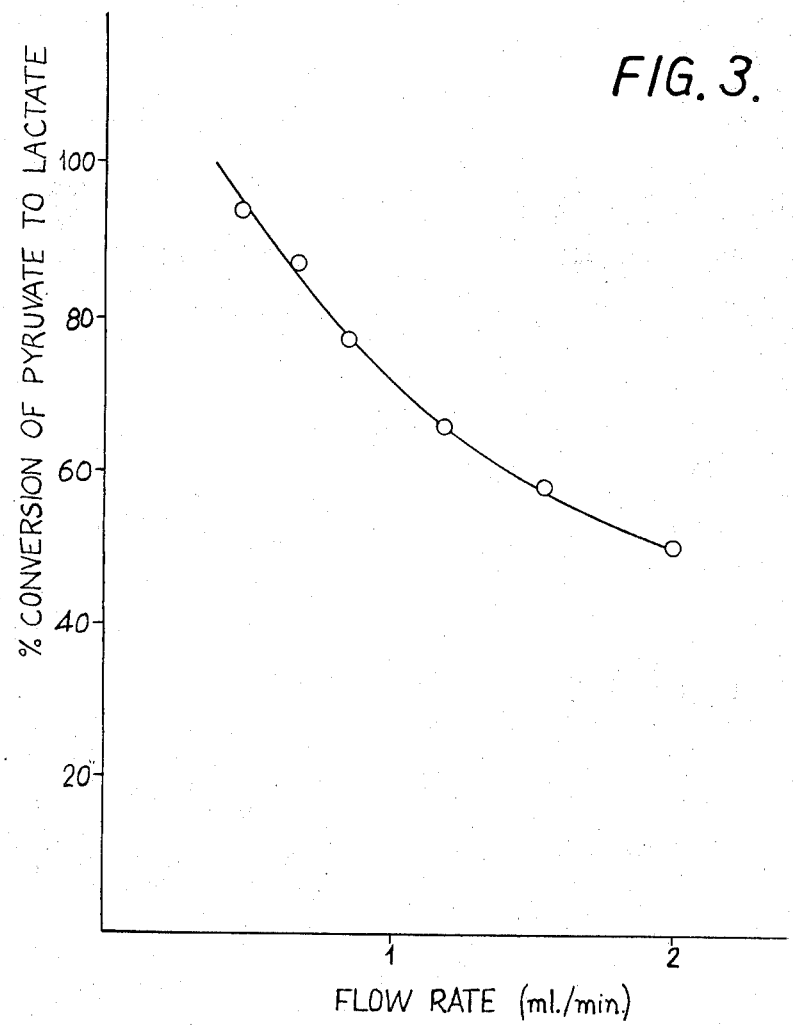

A single disc of the enzymically-active paper was fixed in a small plastic filter holder and backed by a Whatman No. 54 filter paper on the inlet side. The disc was perfused with 1 M-sodium chloride for about 1 hour at 2.5 ml./min. to remove any free enzyme still absorbed in the sheet matrix. The disc was then perfused at 25.5° C. with a solution containing 0.83 M-sodium chloride, 0.01 M-potassium phosphate (pH 7.4) 0.142 mM.-sodium pyruvate and 0.223 mM.-NADH (reduced nicotinamide adenine dinucleotide). The percentages of the pyruvate converted to lactate for different flow rates of the solution through the disc are shown in FIG. 3.

EXAMPLE 4

This example describes the coupling of pencillin amidase to dichloro-s-triazinyl cellulose, and its reaction with benzyl penicillin.

The dichloro-s-triazinyl derivative of Whatman No. 1 cellulose filter paper is prepared by the following method.

Six pieces of 7 centimetres diameter Whatman No. 1 filter paper are soaked in normal sodium hydroxide solution for 5 minutes. The excess sodium hydroxide is removed and the papers are then stirred in 100 millilitres of dioxane for 5 minutes. 5 grams of cyanuric chloride are dissolved in 20 millilitres of dioxane and the paper added to this, followed in 5 seconds by 25 millilitres of water, and in another 5 seconds by 25 millilitres of acetic acid. The liquid is poured off and the paper agitated in dioxane for a few minutes. Equal volumes of water and acetic acid are then added. After 5 minutes the papers are removed and washed with water/acetone mixtures until no smell of cyanuric chloride can be detected. Finally, the papers are dried in a dessicator over silica gel.

Pencillin amidase (7.65 milligrams) in 9 ml. of 0.01 M-phosphate buffer, pH 7.2 is placed in a small dish. Six sheets of the filter paper derivative (7 cm. in diameter) are dropped into the enzyme solution and allowed to react for 10 minutes at 20–25° C. The excess solution is then poured off. A solution of 1N N-(3-aminopropyl)-diethanolamine containing 0.9 N HCl is added and the sheets left for several days at room temperature. The sheets are then mounted in a holder and washed through with the phosphate buffer containing 1 M-sodium chloride. 4.0 milligrams of the enzyme remained attached, and the enzyme retains about 30% of its original activity.

When used for conversion of benzyl penicillin to 6-aminopenicillanic acid the sheets show no loss of activity after 8 weeks at 37° C.

We claim:

1. A continuous method of producing chemical compounds by an enzymatic reaction which comprises (1) flowing a liquid medium containing a substance which is capable of being chemically altered by an enzyme into contact with a permeable or impermeable sheet that comprises an enzyme chemically bonded to an insoluble support through bridging groups of the formula

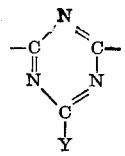

where Y represents a halogen atom or a nucleophilic substituent that is an amino group or an aliphatic or aromatic group, and (2) recovering a product of the reaction.

2. A method according to Claim 1, in which the sheet is permeable and a liquid medium containing a substance which is capable of being chemically altered by the enzyme is passed through the sheet.

3. A method according to Claim 1, in which the sheet is impermeable and a liquid medium containing a substance which is capable of being chemically altered by the enzyme is passed over the sheet.

4. A method according to Claim 2, in which the thickness of the sheet is such that the pressure drop across the sheet is less than about one atmosphere.

5. A method according to Claim 4, in which the thickness of the sheet is between 0.01 inch and 1.0 inch.

6. A method according to Claim 2, in which the flow rate of liquid medium is between 0.01 and 10.0 cubic centimetre per minute per square centimetre of sheet.

7. A method according to Claim 3, in which the sheet is in the form of a tube.

8. A method according to claim 1 in which the insoluble support is a polymer.

9. An insolubilized enzyme comprising an insoluble support in the form of a permeable or impermeable sheet, a bridging group attached to the sheet, and an enzyme chemically bound to the sheet through the bridging group, wherein the sheet is a polymer and the enzyme is chemically bound to the sheet through bridging groups of the formula:

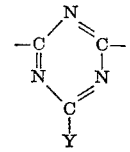

where Y represents a halogen atom or a nucleophilic substitutent that is an amino group or an aliphatic or aromatic group.

References Cited

UNITED STATES PATENTS

| | | | |
|---|---|---|---|
| 3,282,702 | 11/1966 | Schreiner | 195—68 X |
| 3,252,948 | 5/1966 | Manecke et al. | 195—63 X |
| 3,233,593 | 12/1965 | Aldrich et al. | 195—63 |
| 3,278,392 | 10/1966 | Patchornik | 195—63 |
| 3,574,062 | 4/1971 | Sato | 195—63 |

OTHER REFERENCES

Weetall et al.: Anal. Biochem., 14, 160–162 (January 1966).

Weilky et al.: Immuno. Chemistry, vol. 2, pp. 293–322.

LIONEL M. SHAPIRO, Primary Examiner

U.S. Cl. X.R.

195—68, Dig. 11